United States Patent
Zhu

(10) Patent No.: US 11,297,675 B2
(45) Date of Patent: Apr. 5, 2022

(54) IMPLEMENTATION METHOD, DEVICE, USER EQUIPMENT, AND BASE STATION FOR DISCONTINUOUS RECEPTION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 121 days.

(21) Appl. No.: 16/643,935

(22) PCT Filed: Sep. 6, 2017

(86) PCT No.: PCT/CN2017/100736
§ 371 (c)(1),
(2) Date: Mar. 3, 2020

(87) PCT Pub. No.: WO2019/047067
PCT Pub. Date: Mar. 14, 2019

(65) Prior Publication Data
US 2020/0413474 A1    Dec. 31, 2020

(51) Int. Cl.
*H04W 76/28* (2018.01)
*H04W 52/02* (2009.01)
*H04W 72/04* (2009.01)

(52) U.S. Cl.
CPC ....... *H04W 76/28* (2018.02); *H04W 52/0229* (2013.01); *H04W 72/042* (2013.01); *H04W 72/0446* (2013.01)

(58) Field of Classification Search
CPC .......... H04W 52/0229; H04W 72/042; H04W 72/0446; H04W 76/28
See application file for complete search history.

(56) References Cited

U.S. PATENT DOCUMENTS

| | | | | |
|---|---|---|---|---|
| 5,790,946 A | * | 8/1998 | Rotzoll | H04W 52/0229 455/343.1 |
| 6,760,578 B2 | * | 7/2004 | Rotzoll | H04W 52/0229 455/343.2 |

(Continued)

FOREIGN PATENT DOCUMENTS

| | | | | |
|---|---|---|---|---|
| AU | 2017439568 A1 | * | 4/2020 | ......... H04W 52/028 |
| CN | 103200653 A | | 7/2013 | |

(Continued)

OTHER PUBLICATIONS

Xiaomi Technology: "Discussion on paging in NR", 3GPP Draft; R1-1714263, 3rd Generation Partnership Project (3GPP), Mobile Competence Centre; 650, Route Des Lucioles; F-06921 Sophia-Anti Polis Cedex France, vol. RAN WG1, no. Prague, P.R. Czech; Aug. 21, 2017-Aug. 25, 2017 Aug. 20, 2017 (Aug. 20, 2017), XP051317049, the whole document.

(Continued)

*Primary Examiner* — Eric Nowlin
(74) *Attorney, Agent, or Firm* — Syncoda LLC; Feng Ma

(57) ABSTRACT

A method for implementing discontinuous reception includes: when UE is switched from a DRX off stage in an idle state to a DRX on stage, listening indication information sent by a base station is received; and when it is determined based on the listening indication information that it is not needed to continue listening control information in the DRX on stage, the UE is controlled to switch from the DRX on stage to the DRX off stage.

14 Claims, 16 Drawing Sheets

(56) References Cited

U.S. PATENT DOCUMENTS

| | | | | |
|---|---|---|---|---|
| 7,142,838 | B2* | 11/2006 | Rotzoll | H04W 52/0229 455/343.2 |
| 9,225,759 | B2* | 12/2015 | Vannithamby | H04B 7/024 |
| 9,872,252 | B1* | 1/2018 | Ang | H04W 52/0229 |
| 9,872,335 | B2* | 1/2018 | Gershoni | H04W 52/0235 |
| 10,129,827 | B2* | 11/2018 | Latheef | H04L 1/1848 |
| 10,736,038 | B2* | 8/2020 | Li | H04W 16/14 |
| 2005/0020321 | A1* | 1/2005 | Rotzoll | H04W 52/0229 455/572 |
| 2007/0142020 | A1* | 6/2007 | Rotzoll | H04W 52/0293 455/343.1 |
| 2012/0275366 | A1* | 11/2012 | Anderson | H04W 68/025 370/311 |
| 2013/0194991 | A1* | 8/2013 | Vannithamby | H04W 72/0406 370/311 |
| 2014/0036748 | A1* | 2/2014 | Mukherjee | H04W 52/0212 370/311 |
| 2014/0254444 | A1* | 9/2014 | Kim | H04W 52/0225 370/311 |
| 2016/0014697 | A1 | 1/2016 | Mujtaba et al. | |
| 2016/0113059 | A1* | 4/2016 | Vannithamby | H04L 1/1864 370/329 |
| 2016/0262202 | A1* | 9/2016 | Gershoni | H04W 76/28 |
| 2016/0337975 | A1* | 11/2016 | Li | H04W 72/042 |
| 2016/0353382 | A1* | 12/2016 | Xue | H04W 4/80 |
| 2017/0339744 | A1* | 11/2017 | Latheef | H04W 76/28 |
| 2018/0098287 | A1* | 4/2018 | Ang | H04W 76/28 |
| 2019/0335530 | A1* | 10/2019 | Yang | H04W 72/042 |
| 2020/0022082 | A1* | 1/2020 | Ljung | H04W 68/005 |
| 2020/0029302 | A1* | 1/2020 | Cox | H04W 56/0015 |
| 2020/0178171 | A1* | 6/2020 | Lou | H04W 52/0225 |
| 2020/0413474 | A1* | 12/2020 | Zhu | H04W 52/0229 |
| 2021/0195521 | A1* | 6/2021 | Muller | H04W 76/28 |
| 2021/0250899 | A1* | 8/2021 | Liu | H04W 68/005 |
| 2021/0329560 | A1* | 10/2021 | Gao | H04W 48/12 |

FOREIGN PATENT DOCUMENTS

| | | | |
|---|---|---|---|
| CN | 103402245 A | 11/2013 | |
| CN | 103631356 A | 3/2014 | |
| CN | 105191433 A | 12/2015 | |
| EP | 3668189 A1 * | 6/2020 | H04W 72/042 |
| EP | 3668189 A4 * | 8/2020 | H04W 52/0229 |
| WO | 2015113199 A1 | 8/2015 | |
| WO | WO-2019095294 A1 * | 5/2019 | H04L 5/0048 |

OTHER PUBLICATIONS

VIVO: "Discussion on NR paging design", 3GPP Draft; R1-1712826, Discussion on NR Paging Design, 3rd Generation Partnership Project (3GPP), Mobile Competence Centre; 650, Route Des Lucioles; F-06921 Sophia-Antipolis Cedex; France, vol. RAN WG1, no. Prague, Czech Republic; Aug. 21, 2017-Aug. 25, 2017 Aug. 20, 2017 (Aug. 20, 2017), XP051315638, the whole document.

Sierra Wireless: "Idle Mode Power Efficiency Reduction", 3GPP Draft; R1-1714106 Idle Mode V2, 3rd Generation Partnership Project (3GPP), Mobile Competence Centre; 650, Route Des Lucioles; F-06921 Sophia-Antipolis Cedex; France, vol. RAN WG1, no. Prague, Czech Republic; Aug. 21, 2017-Aug. 25, 2017 Aug. 20, 2017 (Aug. 20, 2017), XP051316895, the whole document.

FUJITSU: "Transmission direction identification via OTA signaling", 3GPP Draft; R1-1704483 Transmission Direction Identification Final, 3rd Generation Partnership Project (3GPP), Mobile Competence Centre; 650 , Route Des Lucioles; F-06921 Sophia-Antipolis Cedex; Fra, vol. RAN WG1, no. Spokane, USA; Apr. 3, 2017-Apr. 7, 2017 Apr. 2, 2017 (Apr. 2, 2017), XP051242627, the whole document.

International Search Report in the international application No. PCT/CN2017/100736, dated May 29, 2018.

English translation of the Written Opinion of the International Search Authority in the international application No. PCT/CN2017/100736, dated May 29, 2018.

Supplementary European Search Report in the European application No. 17924133.6, dated Jul. 14, 2020.

First Office Action of the Chinese application No. 201780001544.1, dated Jul. 24, 2020.

First Office Action of the European application No. 17924133.6, dated Jun. 16, 2021.

* cited by examiner

IMPLEMENTATION METHOD, DEVICE, USER EQUIPMENT, AND BASE STATION FOR DISCONTINUOUS RECEPTION

CROSS-REFERENCE TO RELATED APPLICATION

This application is a national stage of International Application No. PCT/CN2017/100736 filed on Sep. 6, 2017, the disclosure of which is hereby incorporated by reference in its entirety.

TECHNICAL FIELD

The present disclosure generally relates to the technical field of communication, and more particularly, to a method and device, a User Equipment (UE) and a base station for implementing discontinuous reception.

BACKGROUND

In a Long-Term Evolution (LTE) system, uplink and downlink transmission of a UE is generally implemented based on scheduling of a base station, and the UE may determine resource positions where data is sent or received based on downlink or uplink scheduling signaling sent by the base station.

In a related art, when a UE works in an idle state (a dormant state), the UE is often needed to periodically wake up based on a configuration of the terminal and listen control information such as paging information on a Physical Downlink Control Channel (PDCCH) in an on-duration stage to determine whether switching to an active state is needed or not. Listening the control information in the on-duration stage may cause relatively high-power consumption of the UE and shorten the battery life of the UE.

SUMMARY

For solving the problem in the related art, embodiments of the present disclosure provide a method and device for implementing discontinuous reception, a UE and a base station, to avoid invalid detection of control information under the circumstance that the UE configures implementation of discontinuous reception to reduce energy consumption.

According to a first aspect of the embodiments of the present disclosure, a method for implementing discontinuous reception (DRX) is provided, which may be applied to a UE and include that:

when the UE is switched from a DRX off stage in an idle state to a DRX on stage, listening indication information sent by a base station is received; and when it is determined based on the listening indication information that it is not needed to continue listening for control information in the DRX on stage, the UE is controlled to switch from the DRX on stage to the DRX off stage.

In an embodiment, the listening indication information may be transmission direction indication information; or, the listening indication information may be listening control signaling; or, the listening indication information may be a wakeup signal.

In an embodiment, the method may further include that:

when the transmission direction indication information indicates that all transmission units in the DRX on stage are non-downlink transmission units, it is determined that it is not needed to continue listening for the control information in the DRX on stage; and when the transmission direction indication information indicates that a downlink transmission unit exists in the DRX on stage, it is determined that it is needed to continue listening for the control information in the DRX on stage.

In an embodiment, the method may further include that:

when it is determined based on the transmission direction indication information that it is needed to listen for the control information in the DRX on stage, a downlink transmission unit needed to be listened in the DRX on stage is determined; and the control information is listened in the downlink transmission unit needed to be listened.

In an embodiment, the method may further include that:

when the listening control signaling indicates to not listen the control information, it is determined that it is not needed to continue listening for the control information in the DRX on stage; and when the listening control signaling indicates to listen the control information, it is determined that it is needed to continue listening for the control information in the DRX on stage.

In an embodiment, the method may further include that:

when the listening control signaling indicates to listen for the control information, the downlink transmission unit needed to be listened is parsed from the listening control signaling; and the control information is listened in the downlink transmission unit.

In an embodiment, the method may further include that:

when the wakeup signal is a first sequence, it is determined that it is not needed to continue listening for the control information in the DRX on stage; and when the wakeup signal is a second sequence, it is determined that it is needed to continue listening for the control information in the DRX on stage.

In an embodiment, the method may further include that:

when it is determined based on the listening indication information that it is needed to listen for the control information in the DRX on stage, the control information is continued to be listened in the DRX on stage.

In an embodiment, the operation that the listening indication information sent by the base station is received may include that:

a position for transmitting the listening indication information in the DRX on stage is determined based on a system protocol;

a window or a position for receiving the listening indication information is determined based on the position for transmitting the listening indication information in the DRX on stage; and the listening indication information is received at the window or the position for receiving the listening indication information.

In an embodiment, the operation that the listening indication information sent by the base station is received may include that:

control signaling containing a position for transmitting the listening indication information in the DRX on stage is received;

a window or a position for receiving the listening indication information is determined based on the position for transmitting the listening indication information in the DRX on stage; and the listening indication information is received at the window or the position for receiving the listening indication information.

According to a second aspect of the embodiments of the present disclosure, a method for implementing discontinuous reception is provided, which may be applied to a base station and include that:

when a UE is switched from a DRX off stage in an idle state to a DRX on stage, listening indication information to be sent is determined based on whether downlink control information or data is needed to be sent to the UE or not; and the listening indication information is sent.

In an embodiment, the listening indication information may be transmission direction indication information; or, the listening indication information may be listening control signaling; or, the listening indication information may be a wakeup signal.

In an embodiment, the method may further include that:

control signaling containing a position for transmitting the listening indication information in the DRX on stage is sent to the UE, the control signaling being configured for the UE to determine a window or a position for receiving the listening indication information.

In an embodiment, the operation that the listening indication information to be sent is determined based on whether the downlink control information or data is needed to be sent to the UE or not may include that:

when the downlink control information or data is needed to be sent to the UE, it is determined that the listening indication information to be sent is indication information instructing the UE to continue listening for the control information in the DRX on stage; or when the downlink control information or data is not needed to be sent to the UE, it is determined that the listening indication information to be sent is indication information instructing the UE to not continue listening for the control information in the DRX on stage.

According to a third aspect of the embodiments of the present disclosure, a device for implementing discontinuous reception is provided, which may be applied to a UE and include:

a first receiving module, configured to, when the UE is switched from a DRX off stage in an idle state to a DRX on stage, receive listening indication information sent by a base station; and a switching module, configured to, in response to determining based on the listening indication information received by the first receiving module that it is not needed to continue listening for control information in the DRX on stage, control the UE to switch from the DRX on stage to the DRX off stage.

In an embodiment, the listening indication information may be transmission direction indication information; or, the listening indication information may be listening control signaling; or, the listening indication information may be a wakeup signal.

In an embodiment, the device may further include:

a first determination module, configured to, when the transmission direction indication information indicates that all transmission units in the DRX on stage are non-downlink transmission units, determine that it is not needed to continue listening for the control information in the DRX on stage; and a second determination module, configured to, when the transmission direction indication information indicates that a downlink transmission unit exists in the DRX on stage, determine that it is needed to continue listening for the control information in the DRX on stage.

In an embodiment, the device may further include:

a downlink transmission determination module, configured to, in response to determining based on the transmission direction indication information that it is needed to listen for the control information in the DRX on stage, determine a downlink transmission unit needed to be listened in the DRX on stage; and a first listening module, configured to listen for the control information in the downlink transmission unit needed to be listened.

In an embodiment, the device may further include:

a third determination module, configured to, when the listening control signaling indicates to not listen for the control information, determine that it is not needed to continue listening for the control information in the DRX on stage; and a fourth determination module, configured to, when the listening control signaling indicates to listen for the control information, determine that it is needed to continue listening for the control information in the DRX on stage.

In an embodiment, the device may further include:

an analysis module, configured to, when the listening control signaling indicates to listen for the control information, parse, from the listening control signaling, the downlink transmission unit needed to be listened; and a second listening module, configured to listen for the control information in the downlink transmission unit.

In an embodiment, the device may further include:

a fifth determination module, configured to, when the wakeup signal is a first sequence, determine that it is not needed to continue listening for the control information in the DRX on stage; and a sixth determination module, configured to, when the wakeup signal is a second sequence, determine that it is needed to continue listening for the control information in the DRX on stage.

In an embodiment, the device may further include:

a third listening module, configured to, in response to determining based on the listening indication information that it is needed to listen for the control information in the DRX on stage, continue listening for the control information in the DRX on stage.

In an embodiment, the first receiving module may include:

a position determination submodule, configured to determine a position for transmitting the listening indication information in the DRX on stage based on a system protocol;

a first determination submodule, configured to determine a window or a position for receiving the listening indication information based on the position for transmitting the listening indication information in the DRX on stage; and a first receiving submodule, configured to receive the listening indication information at the window or the position for receiving the listening indication information.

In an embodiment, the first receiving module may include:

a second receiving submodule, configured to receive control signaling containing a position for transmitting the listening indication information in the DRX on stage;

a second determination submodule, configured to determine a window or position for receiving the listening indication information based on the position for transmitting the listening indication information in the DRX on stage; and a third receiving submodule, configured to receive the listening indication information at the window or the position for receiving the listening indication information.

According to a fourth aspect of the embodiments of the present disclosure, a device for implementing discontinuous reception is provided, which may be applied to a base station and include:

a seventh determination module, configured to, when a UE is switched from a DRX off stage in an idle state to a DRX on stage, determine, based on whether downlink control information or data is needed to be sent to the UE or not, listening indication information to be sent; and a first sending module, configured to send the listening indication information.

In an embodiment, the listening indication information may be transmission direction indication information; or, the listening indication information may be listening control signaling; or, the listening indication information may be a wakeup signal.

In an embodiment, the device may further include:

a second sending module, configured to send, to the UE, control signaling containing a position for transmitting the listening indication information in the DRX on stage, the control signaling being configured for the UE to determine a window or a position for receiving the listening indication information.

In an embodiment, the seventh determination module may include:

a third determination submodule, configured to, when the downlink control information or data is needed to be sent to the UE, determine that the listening indication information to be sent is indication information instructing the UE to continue listening for the control information in the DRX on stage; and a fourth determination submodule, configured to, when the downlink control information or data is not needed to be sent to the UE, determine that the listening indication information to be sent is indication information instructing the UE to not continue listening for the control information in the DRX on stage.

According to a fifth aspect of the embodiments of the present disclosure, a UE is provided, which may include:

a third determination submodule, configured to, when the downlink control information or data is needed to be sent to the UE, determine that the listening indication information to be sent is indication information instructing the UE to continue listening for the control information in the DRX on stage; and a fourth determination submodule, configured to, when the downlink control information or data is not needed to be sent to the UE, determine that the listening indication information to be sent is indication information instructing the UE to not continue listening for the control information in the DRX on stage.

According to a fifth aspect of the embodiments of the present disclosure, a UE is provided, which may include:

a processor; and a memory configured to store an instruction executable by the processor, wherein the processor may be configured to:

when the UE is switched from a DRX off stage in an idle state to a DRX on stage, receive listening indication information from a base station; and when it is determined based on the listening indication information that it is not needed to continue listening for control information in the DRX on stage, control the UE to switch from the DRX on stage to the DRX off stage.

According to a sixth aspect of the embodiments of the present disclosure, a base station is provided, which may include:

a processor; and a memory configured to store an instruction executable by the processor, wherein the processor may be configured to:

when UE is switched from a DRX off stage in an idle state to a DRX on stage, determine, based on whether downlink control information or data is needed to be sent to the UE or not, listening indication information to be sent; and send the listening indication information.

According to a seventh aspect of the embodiments of the present disclosure, a non-transitory computer-readable storage medium is provided, which has a computer instruction stored thereon that, when executed by a processor, may implement the following steps of:

when a UE is switched from a DRX off stage in an idle state to a DRX on stage, receiving listening indication information from a base station; and in response to determining based on the listening indication information that it is not needed to continue listening for control information in the DRX on stage, controlling the UE to switch from the DRX on stage to the DRX off stage.

According to an eighth aspect of the embodiments of the present disclosure, a non-transitory computer-readable storage medium is provided, which has a computer instruction stored thereon that, when executed by a processor, may implement the following steps of:

when UE is switched from a DRX off stage in an idle state to a DRX on stage, determining, based on whether downlink control information or data is needed to be sent to the UE or not, listening indication information to be sent; and sending the listening indication information.

The technical solutions provided in the embodiments of the present disclosure may have the following beneficial effects.

When a UE is switched from a DRX off stage in an idle state to a DRX on stage, whether it is needed to continue listening for control information in the DRX on stage or not may be determined based on the listening indication information sent by the base station, and when it is determined that it is not needed to continue listening for the control information, the UE may be controlled to switch from the DRX on stage to the DRX off stage, so that invalid detection of control information can be avoided, and energy consumption in detection of control information can be reduced.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
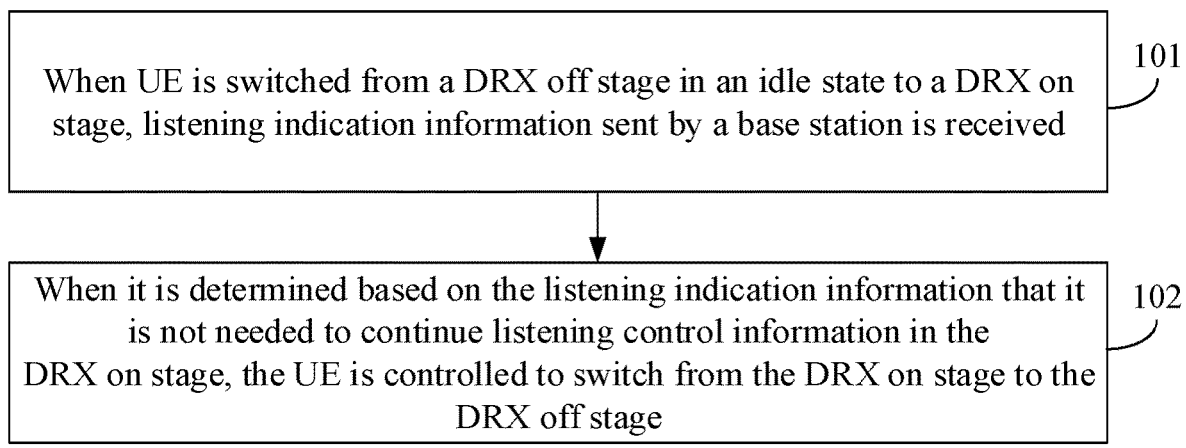
FIG. 1A is a flowchart showing a method for implementing discontinuous reception according to an exemplary embodiment.
Figure 1B:
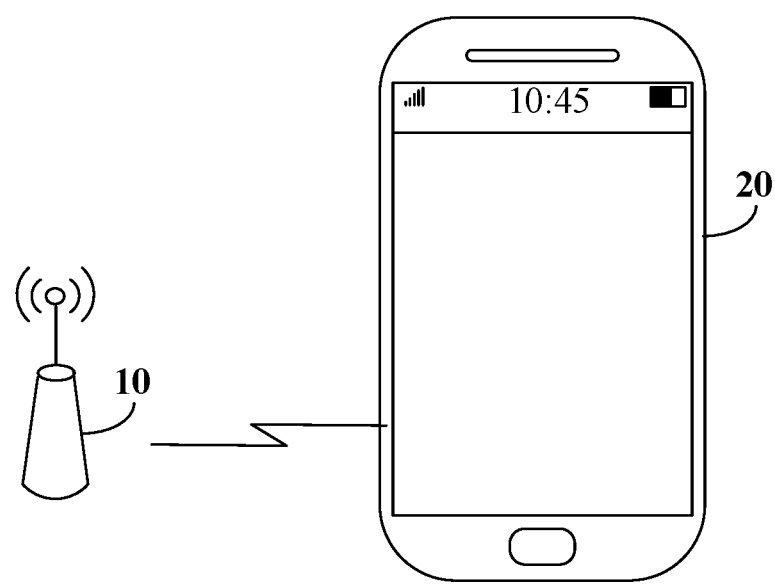
FIG. 1B is a scenario diagram of a method for implementing discontinuous reception according to an exemplary embodiment.

FIG. 1A is a flowchart showing a method for implementing discontinuous reception according to an exemplary embodiment. FIG. 1B is a scenario diagram of a method for implementing discontinuous reception according to an exemplary embodiment. The method for implementing discontinuous reception may be applied to UE. As shown in FIG. 1A, the method for implementing discontinuous reception includes the following Steps 101-102.

In Step 101, when the UE is switched from a DRX off stage in an idle state to a DRX on stage, listening indication information sent by a base station is received.

In an embodiment, the UE working in the idle state may be periodically switched from the DRX off stage to the DRX on stage based on a configuration of the base station, for example, the UE may be switched to the active (on-duration) stage every time when entering the DRX off stage for 5 ms.

In an embodiment, the listening indication information may be transmission direction indication information, and the transmission direction indication information can indicate a transmission direction (for example, uplink and downlink) of a transmission unit (for example, a subframe and a slot) in the DRX on stage of the UE. In an embodiment, the listening indication information may be listening control signaling, and the listening control signaling can be signaling indicating whether the UE is needed to continue listening control information in the DRX on stage or not and, if listening is needed, further indicating a position needed to be listened by the UE, i.e., a downlink transmission unit needed to be listened. In an embodiment, the listening indication information may be a wakeup signal, the wakeup signal may be a sequence group, and the base station may send different sequences in the sequence group to the UE to indicate whether the UE needs to continue listening the control information or not.

In Step 102, when it is determined based on the listening indication information that it is not needed to continue listening for control information in the DRX on stage, the UE is controlled to switch from the DRX on stage to the DRX off stage.

In an embodiment, a method for determining whether it is needed to continue listening the control information such as paging information in the DRX on stage or not based on the listening indication information may refer to descriptions in the embodiment shown in FIG. 2A to FIG. 4, and elaborations thereof are omitted herein.

In an embodiment, the UE, when determining that it is not needed to continue listening for the control information in the DRX on stage, may stop working in the DRX on stage and may be directly switched to the DRX off stage. For example, in a case that the DRX on stage specified in a system protocol is a time length of 5 transmission units, the UE, when detecting the listening indication information in the first transmission unit and determining based on the listening indication information that it is not needed to continue listening for the control information, may be switched to the DRX off stage immediately and is not needed to work for the time length of the 5 transmission units in the DRX on stage.

In an exemplary embodiment, referring to FIG. 1B, the scenario shown in FIG. 1B includes a base station 10 and a UE 20 (for example, a smart phone and a tablet computer). The base station may send listening indication information to the UE 20 when the UE 20 enters the DRX on stage from the DRX off stage in the idle state, and the UE 20 may determine whether to listen for control information in the DRX on stage or switch to the DRX off stage again based on the listening indication information. Therefore, the UE may be directly switched to the DRX off stage when there is no downlink control data or downlink control information for the UE in the DRX on stage, and a detection overhead of the UE can be effectively reduced.

According to the embodiment, through Step 101 to Step 102, when the UE is switched from the DRX off stage in the idle state to the DRX on stage, whether it is needed to continue listening for the control information in the DRX on stage or not may be determined based on the listening indication information sent by the base station; when it is determined that it is not needed to continue listening for the control information, the UE may be controlled to switch from the DRX on stage to the DRX off stage, so that invalid detection of control information can be avoided, and energy consumption in detection of control information can be reduced.

How to implement discontinuous reception may refer to the following embodiments.

Figure 2A:
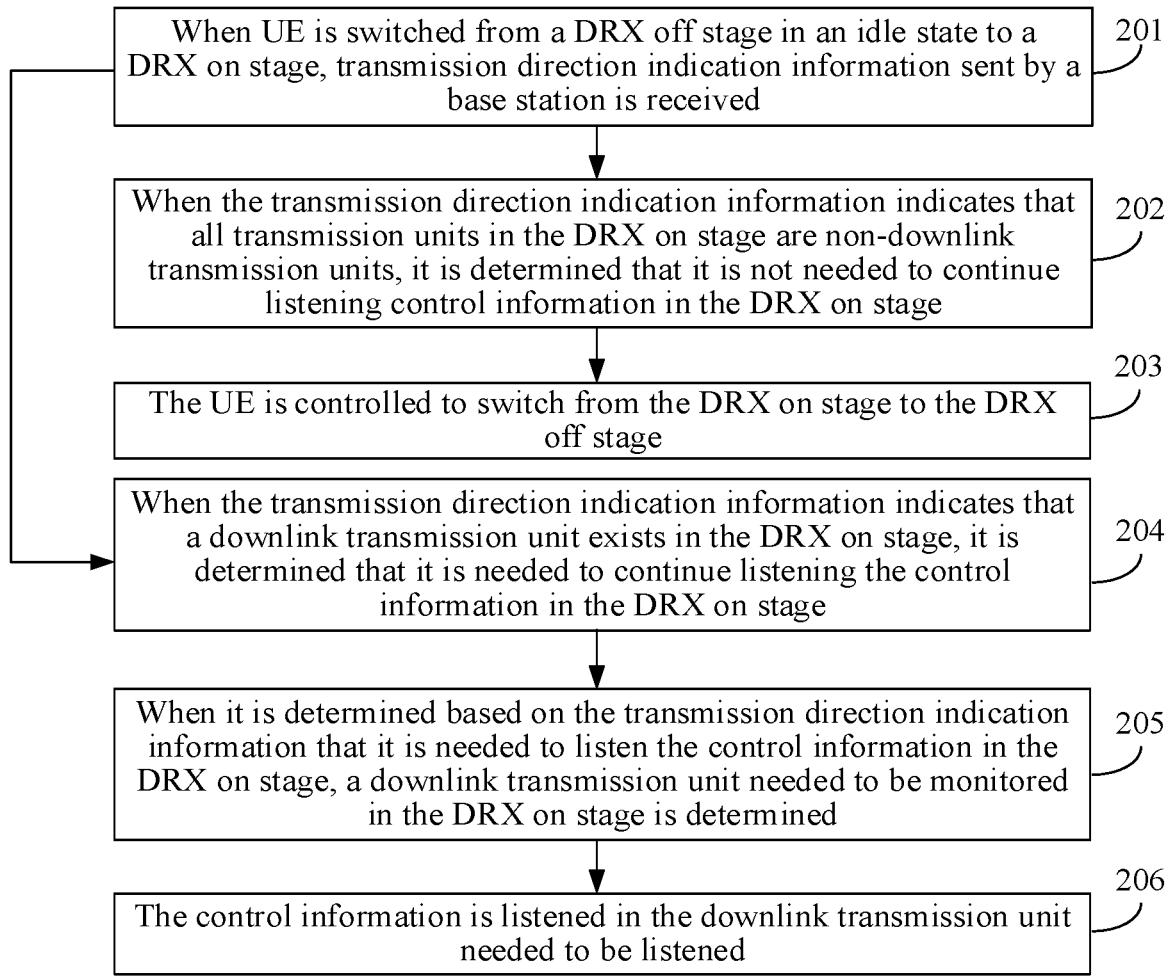
FIG. 2A is a flowchart showing another method for implementing discontinuous reception according to an exemplary embodiment.
Figure 2B:
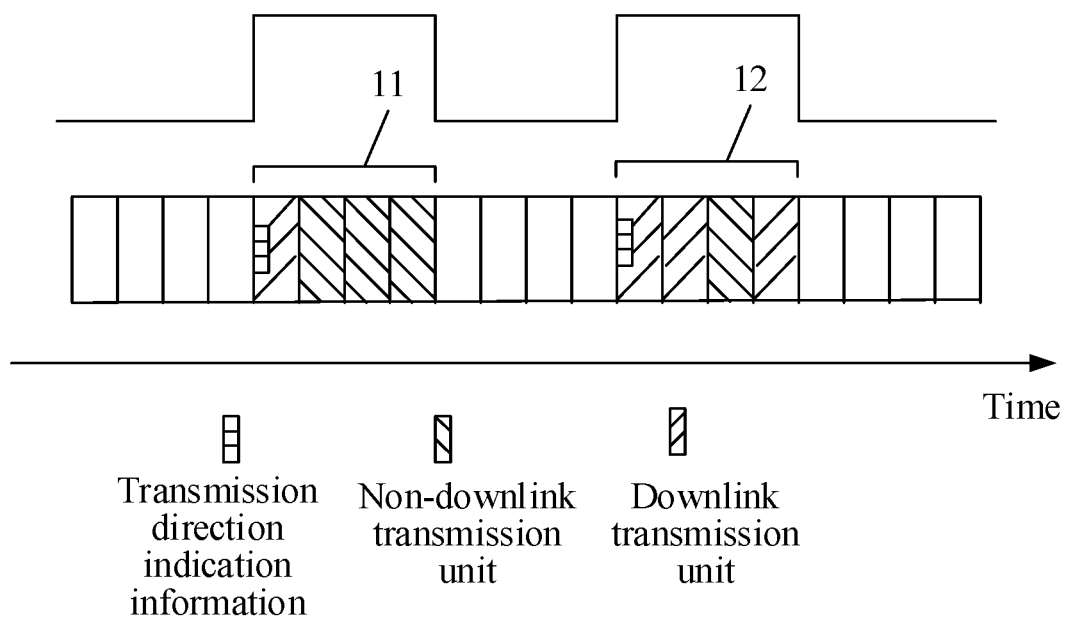
FIG. 2B is a schematic diagram illustrating sending of transmission direction indication information according to an exemplary embodiment.

FIG. 2A is a flowchart showing another method for implementing discontinuous reception according to an exemplary embodiment. FIG. 2B is a schematic diagram illustrating sending of transmission direction indication information according to an exemplary embodiment. In the embodiment, how to reduce energy consumption in detection of control information is exemplarily described by use of the method provided in the embodiment of the present disclosure with the condition that listening indication information is transmission direction indication information as an example. As shown in FIG. 2A, the following steps are included.

In Step 201, when UE is switched from a DRX off stage in an idle state to a DRX on stage, transmission direction indication information sent by a base station is received, and Step 202 or Step 204 is executed.

In an embodiment, the transmission direction indication information may indicate transmission directions of all transmission units in the DRX on stage of the UE. It is to be noted that all the transmission units in the DRX on stage may be understood as transmission units in the DRX on stage other than a transmission unit configured to transmit the transmission direction indication information. As shown in FIG. 2B, all the transmission units in the DRX on stage indicated by label 11 are non-downlink transmission units, and the DRX on stage indicated by label 12 includes a downlink transmission unit.

In an embodiment, a specific position where the base station sends the transmission direction indication information may be predetermined by a system, for example, the position may be determined to be at a border of a first transmission unit in the DRX on stage. In an embodiment, the specific position where the base station sends the transmission direction indication information may also be sent to the UE by the base station through Radio Resource Control (RRC) signaling, or physical-layer signaling or a Media Access Control (MAC) Control Element (CE).

In an embodiment, the transmission direction indication information may be public information for all or part of UEs served by the base station, or may also be dedicated information for a UE.

In an embodiment, the transmission direction indication information may be transmitted through a PDCCH.

In Step 202, when the transmission direction indication information indicates that all transmission units in the DRX on stage are non-downlink transmission units, it is determined that it is not needed to continue listening for control information in the DRX on stage.

In Step 203, the UE is controlled to switch from the DRX on stage to the DRX off stage, and the flow is ended.

In Step 204, when the transmission direction indication information indicates that a downlink transmission unit exists in the DRX on stage, it is determined that it is needed to continue listening for the control information in the DRX on stage.

In Step 205, when it is determined based on the transmission direction indication information that it is needed to listen for the control information in the DRX on stage, a downlink transmission unit needed to be listened in the DRX on stage is determined.

In an embodiment, the transmission direction indication information may further indicate the specific transmission units that are downlink transmission units. For example, the transmission direction indication information may indicate that the second and fourth transmission units in the DRX on stage are downlink transmission units. In an embodiment, the transmission direction indication information may further indicate the specific transmission units that are non-downlink transmission units. For example, the transmission direction indication information may indicate that the third transmission unit in the DRX on stage is a non-downlink transmission unit, and then it may be determined that all the other transmission units other than the third transmission unit are downlink transmission units.

In Step 206, the control information is listened in the downlink transmission unit needed to be listened.

In an embodiment, the UE, after determining the downlink transmission unit, may listen the control information only in the downlink transmission unit, to avoid power consumption caused by listening of the control information in the non-downlink transmission unit.

In the embodiment, a manner of determining whether it is needed to listen for the control information in the DRX on stage or not based on the transmission direction indication information is described. Since the transmission direction indication information indicates directions of all the transmission units in the DRX on stage, the control information may be listened only in the downlink transmission unit when it is determined that it is needed to listen for the control information, and the power consumption caused by listening of the control information in the non-downlink transmission unit is avoided.

Figure 3:
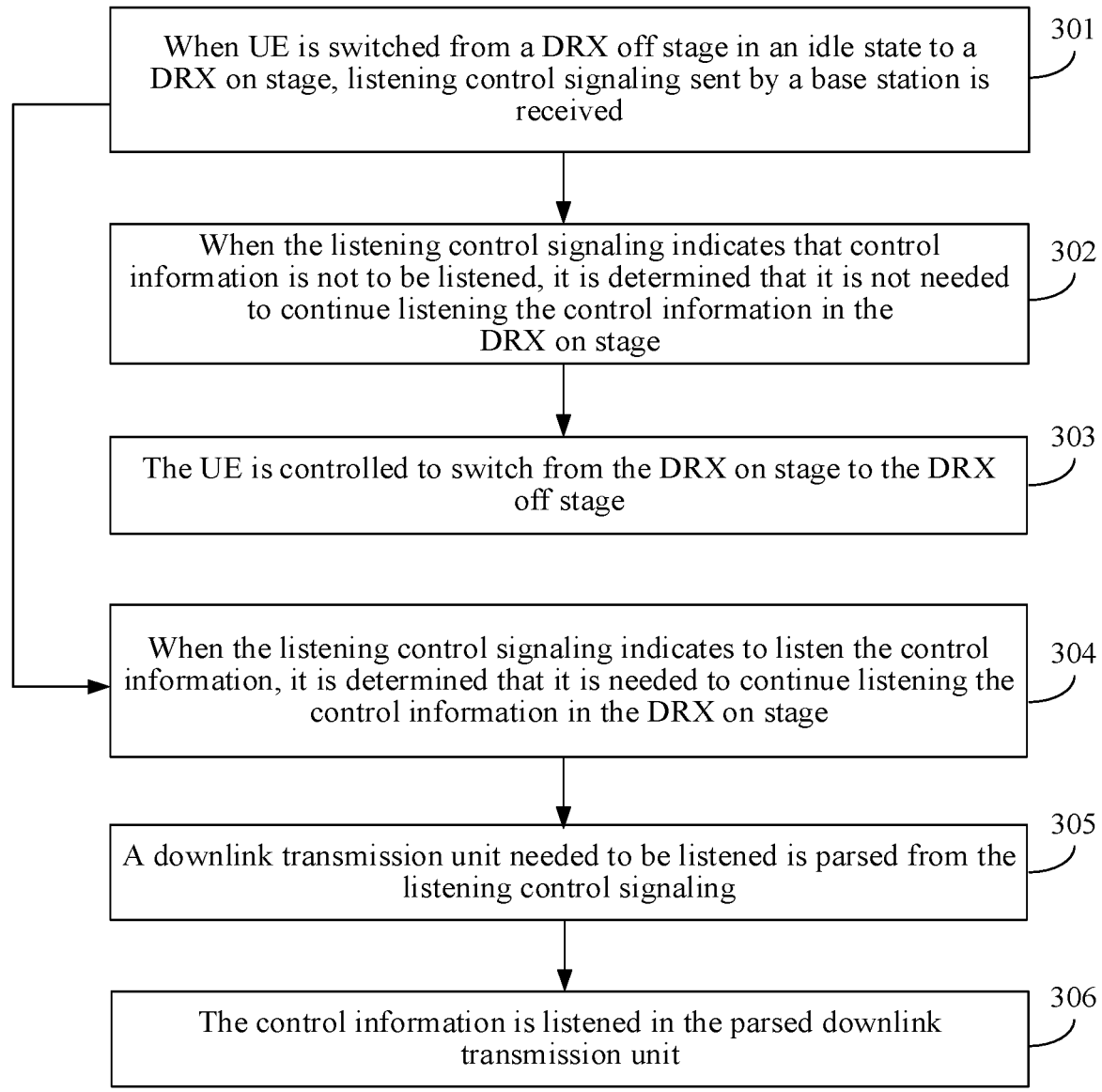
FIG. 3 is a flowchart showing another method for implementing discontinuous reception according to an exemplary embodiment.

FIG. 3 is a flowchart showing another method for implementing discontinuous reception according to an exemplary embodiment. In the embodiment, how to reduce energy consumption in detection of control information is exemplarily described by use of the method provided in the embodiment of the present disclosure with the condition that listening indication information is listening control signaling as an example. As shown in FIG. 3, the following steps are included.

In Step 301, when UE is switched from a DRX off stage in an idle state to a DRX on stage, listening control signaling sent by a base station is received, and Step 302 or Step 304 is executed.

In an embodiment, the listening control signaling may explicitly indicate whether the UE is needed to listen for control information in the DRX on stage or not.

In an embodiment, the base station may determine the listening control signaling to be sent based on whether there is downlink control information and downlink control data for the UE in the DRX on stage or not. For example, the base station, when determining that there is no downlink control information or downlink control data needed to be listened by the UE in the DRX on stage, may send listening control signaling indicating that listening is not needed to the UE. The base station, when determining that there is downlink control information and downlink control data needed to be listened by the UE in the DRX on stage, may send listening control signaling indicating that listening is needed to the UE.

In an embodiment, a specific position where the base station sends the listening control signaling may be predetermined by a system, for example, the position may be determined to be at a border of a first transmission unit in the DRX on stage. In an embodiment, the specific position where the base station sends the listening control signaling may be sent to the UE by the base station through RRC signaling or physical-layer signaling or a MAC CE.

In an embodiment, the listening control signaling may be public signaling for all or part of UEs served by the base station, or may also be dedicated signaling for a UE.

In an embodiment, the listening control signaling may be transmitted through a PDCCH.

In Step 302, when the listening control signaling indicates that control information is not to be listened, it is determined that it is not needed to continue listening for the control information in the DRX on stage.

In Step 303, the UE is controlled to switch from the DRX on stage to the DRX off stage, and the flow is ended.

In Step 304, when the listening control signaling indicates to listen the control information, it is determined that it is needed to continue listening for the control information in the DRX on stage.

In Step 305, a downlink transmission unit needed to be listened is parsed from the listening control signaling.

In an embodiment, the listening control signaling may further contain a specific position where the UE listens for the control information, namely indicating the downlink transmission unit needed to be listened by the UE.

In Step 306, the control information is listened in the parsed downlink transmission unit.

In the embodiment, the UE may directly determine whether it is needed to listen the control information or not based on the listening control signaling and may be switched to the DRX off stage when listening is not needed, so that a processing complexity of the UE is further reduced, and energy consumption when it is not needed to listen the control information is greatly reduced.

Figure 4:
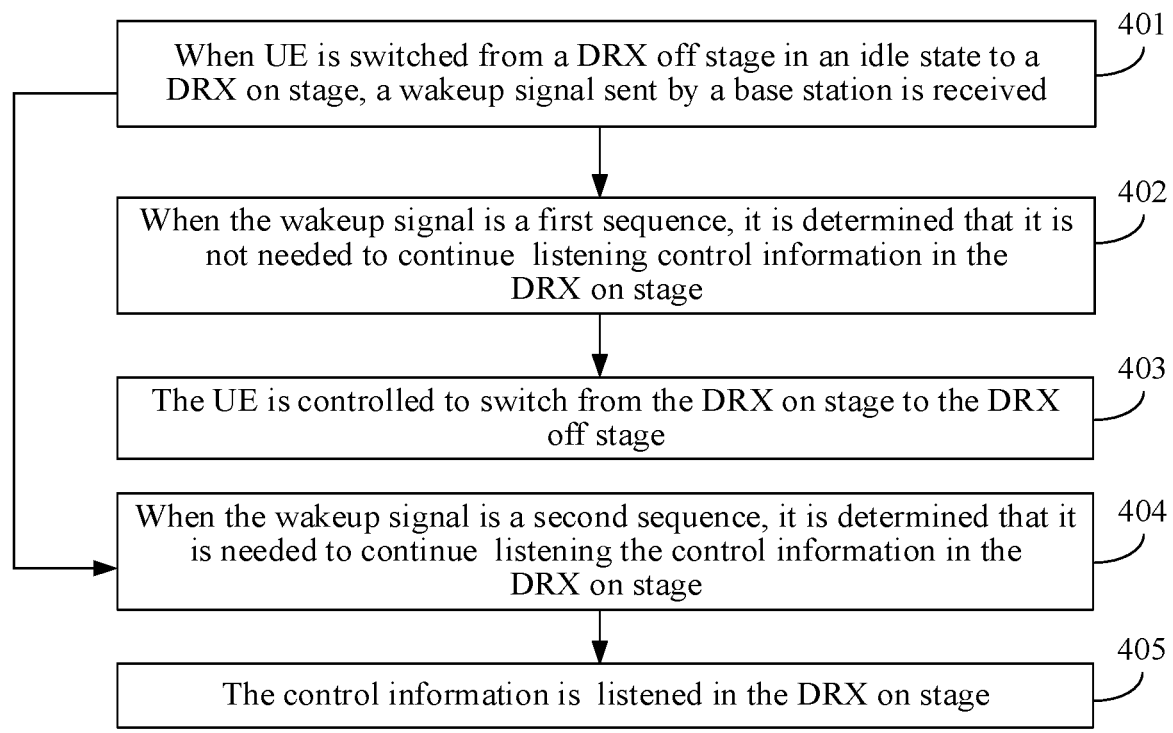
FIG. 4 is a flowchart showing another method for implementing discontinuous reception according to an exemplary embodiment.

FIG. 4 is a flowchart showing another method for implementing discontinuous reception according to an exemplary embodiment. In the embodiment, how to reduce energy consumption in detection of control information is exemplarily described by use of the method provided in the embodiment of the present disclosure with the condition that listening indication information is a wakeup signal as an example. As shown in FIG. 4, the following steps are included.

In Step 401, when UE is switched from a DRX off stage in an idle state to a DRX on stage, a wakeup signal sent by a base station is received, and Step 402 or Step 404 is executed.

In an embodiment, the wakeup signal may be a sequence group including at least two sequences, i.e., a first sequence and a second sequence respectively. The first sequence may indicate that it is not needed to continue listening for control information, and the second sequence may indicate that it is needed to continue listening for the control information.

In an embodiment, a specific position where the base station sends the wakeup signal may be predetermined by a system, for example, the position may be determined to be at a border of a first transmission unit in the DRX on stage. In an embodiment, the specific position where the base station sends the wakeup signal may also be sent to the UE by the base station through RRC signaling or physical-layer signaling or a MAC CE. In an embodiment, the UE may determine the position for the sending wakeup signal in a blind detection manner.

In an embodiment, the wakeup signal may be public information for all or part of UEs served by the base station, or may also be dedicated information for a UE.

In Step 402, when the wakeup signal is a first sequence, it is determined that it is not needed to continue listening for control information in the DRX on stage.

In Step 403, the UE is controlled to switch from the DRX on stage to the DRX off stage, and the flow is ended.

In Step 404, when the wakeup signal is a second sequence, it is determined that it is needed to continue listening for the control information in the DRX on stage.

In Step 405, the control information is listened in the DRX on stage.

In the embodiment, the UE may directly determine whether the control information is to be listened or not based on the wakeup signal. In such a manner of determining whether to listen for the control information or not through two groups of sequences, energy consumption can be lower, and excessive occupation of communication resources is avoided, so that not only power consumption caused by listening for the control information in a non-downlink transmission unit is avoided, but also occupied communication resources are reduced.

Figure 5:
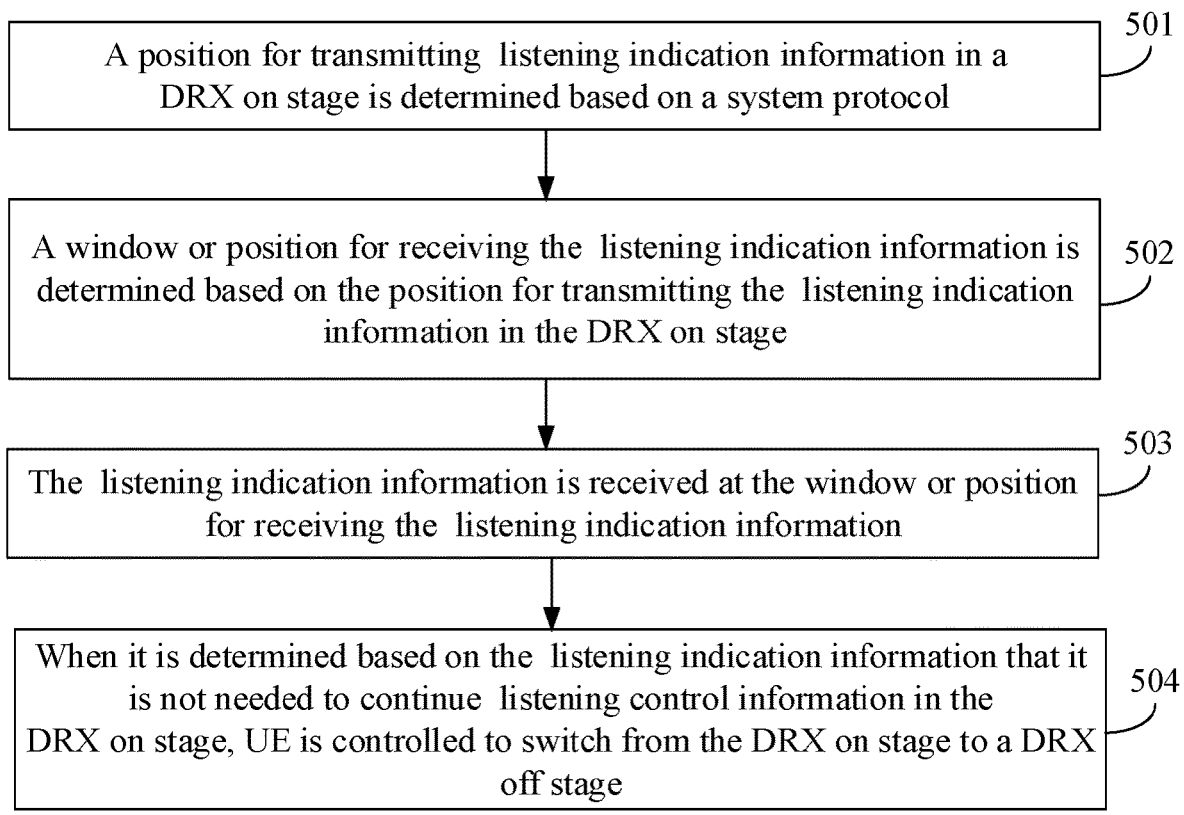
FIG. 5 is a flowchart showing another method for implementing discontinuous reception according to an exemplary embodiment.

FIG. 5 is a flowchart showing another method for implementing discontinuous reception according to an exemplary embodiment. In the embodiment, exemplary descriptions are made based on the method provided in the embodiment of the present disclosure with how UE reduces energy consumption in detection of control information as an example. As shown in FIG. 5, the following steps are included.

In Step 501, a position for transmitting listening indication information in a DRX on stage is determined based on a system protocol.

In an embodiment, a communication system may predetermine the position for transmitting the listening indication information in the DRX on stage, for example, at a border of a first transmission unit in the DRX on stage, namely the listening indication information may be sent immediately when UE enters the DRX on stage.

In Step 502, a window or position for receiving the listening indication information is determined based on the position for transmitting the listening indication information in the DRX on stage.

In an embodiment, the UE may determine the window or the position for receiving the listening indication information based on the position for transmitting the listening indication information in the DRX on stage and based on the time when the DRX on stage is entered, and the UE may continue listening for the control information in the receiving window. For example, when the UE only indicates that listening is needed but does not specify the specific receiving position, the whole DRX on stage may be determined as the receiving window. The UE may receive control information at the receiving position only. For example, when the UE indicates the specific receiving position, the control information may be received at the receiving position only.

In Step 503, the listening indication information is received at the window or the position for receiving the listening indication information.

In Step 504, when it is determined based on the listening indication information that it is not needed to continue listening for control information in the DRX on stage, UE is controlled to switch from the DRX on stage to a DRX off stage.

In an embodiment, descriptions about Step 504 may refer to the descriptions about Step 102 in the embodiment shown in FIG. 1A, and elaborations thereof are omitted herein.

In the embodiment, a manner of determining the receiving window based on the transmission position, predetermined by the system, of the listening indication information in the DRX on stage is described, so that the UE may be helped to pertinently receive the listening indication information, and power consumption caused by continuous information listening of the UE can be reduced.

Figure 6:
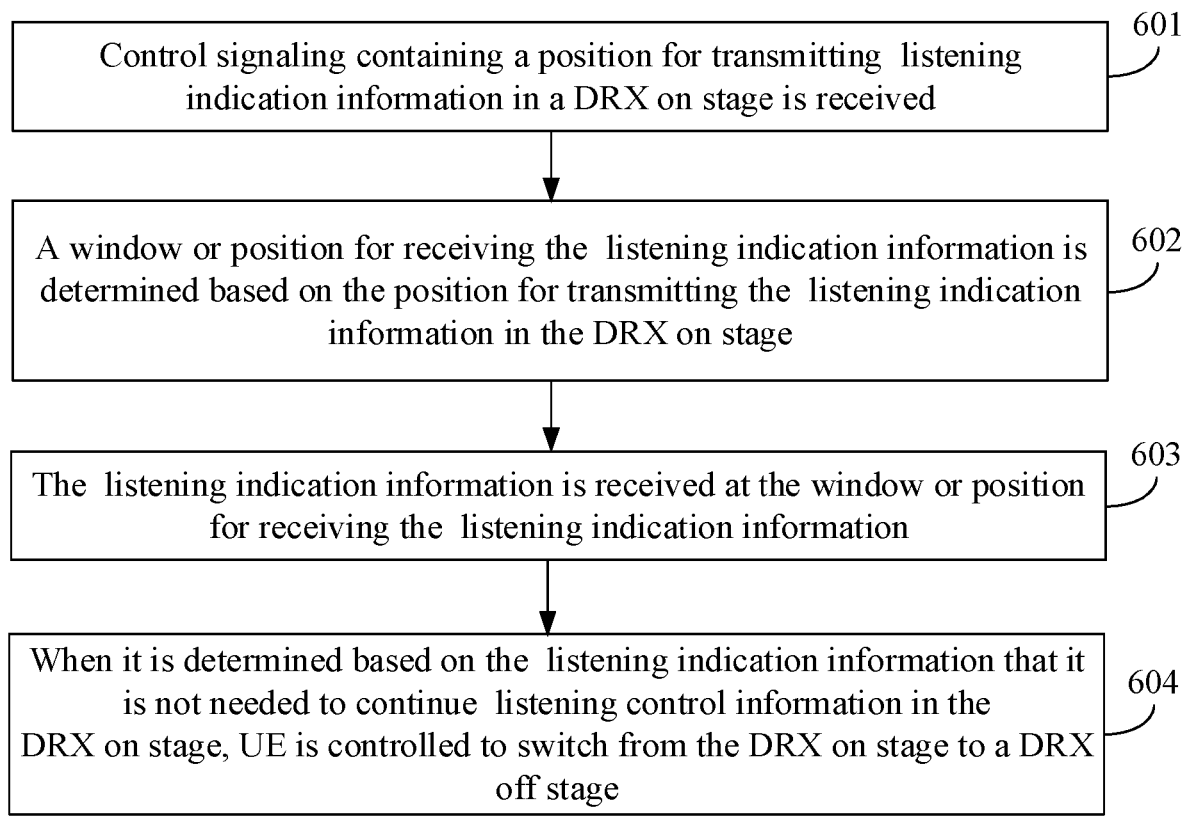
FIG. 6 is a flowchart showing another method for implementing discontinuous reception according to an exemplary embodiment.

FIG. 6 is a flowchart showing another method for implementing discontinuous reception according to an exemplary embodiment. In the embodiment, exemplary descriptions are made by use of the method provided in the embodiment of the present disclosure with how UE reduces energy consumption in detection of control information as an example. As shown in FIG. 6, the following steps are included.

In Step 601, control signaling containing a position for transmitting listening indication information in a DRX on stage is received.

In an embodiment, the control signaling containing the position for transmitting the listening indication information in the DRX on stage may be RRC signaling or physical-layer signaling or control signaling with a MAC CE.

In Step 602, a window or a position for receiving the listening indication information is determined based on the position for transmitting the listening indication information in the DRX on stage.

In Step 603, the listening indication information is received at the window or the position for receiving the listening indication information.

In Step 604, in response to determining based on the listening indication information that it is not needed to continue listening for control information in the DRX on stage, UE is controlled to switch from the DRX on stage to a DRX off stage.

In an embodiment, descriptions about Step 604 may refer to the descriptions about Step 102 in the embodiment shown in FIG. 1A, and elaborations thereof are omitted herein.

In the embodiment, the control signaling containing the position for transmitting the listening indication information may be received from a base station to determine the receiving window and further pertinently receive the listening indication information, so that power consumption caused by continuous information listening of the UE is reduced.

Figure 7:
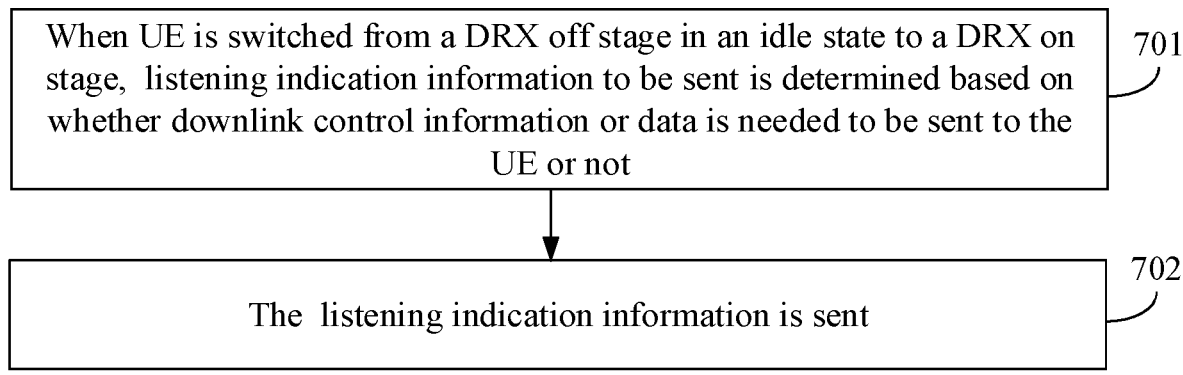
FIG. 7 is a flowchart showing a method for implementing discontinuous reception according to an exemplary embodiment.

FIG. 7 is a flowchart showing a method for implementing discontinuous reception according to an exemplary embodiment. The method for implementing discontinuous reception may be applied to a base station. As shown in FIG. 7, the method for implementing discontinuous reception includes the following Steps 701-702.

In Step 701, when UE is switched from a DRX off stage in an idle state to a DRX on stage, listening indication information to be sent is determined based on whether downlink control information or data is needed to be sent to the UE or not.

In an embodiment, the listening indication information may be transmission direction indication information, and the transmission direction indication information may indicate a transmission direction (for example, uplink and downlink) of a transmission unit (for example, a subframe and a slot) in the DRX on stage of the UE. In an embodiment, the listening indication information may be listening control signaling, and the listening control signaling may be signaling indicating whether the UE is needed to continue listening for control information in the DRX on stage or not. In an embodiment, the listening indication information may be a wakeup signal, the wakeup signal may be a sequence group, and the base station may send different sequences in the sequence group to the UE to indicate whether the UE is needed to continue listening for the control information or not.

In Step 702, the listening indication information is sent.

In an embodiment, the base station may send the listening indication information at a transmission position predetermined by a system. When it is determined to send the listening indication information at a border of a first transmission unit in the DRX on stage, the listening indication information may be sent at the border of the first transmission unit in the DRX on stage. In an embodiment, the base station may also send, to the UE, control signaling, such as RRC signaling or physical-layer signaling or a MAC CE, containing the position for transmitting the listening indication information in the DRX on stage in advance so as to enable the UE to determine a window for receiving the listening indication information based on the control signaling, and send the listening indication information at the transmission position for sending the listening indication information in the DRX on stage.

In an embodiment, the listening indication information may be public information for all or part of UEs served by the base station, such as the time when multiple UEs enter DRX on stages. When there is no corresponding downlink control information or data for the multiple UEs in the corresponding DRX on stages, the listening indication information may be simultaneously sent to the multiple UEs. In an embodiment, the listening indication information may be dedicated information for a UE.

According to the embodiment, through Step 701 to Step 702, when the UE is switched from the DRX off stage in the idle state to the DRX on stage, the listening indication information may be sent to the UE to instruct the UE whether to switch from the DRX off stage to the DRX on stage again or not, so that the condition that the UE continues listening control information when there is no downlink control information or data for the UE in the DRX on stage can be avoided, and energy consumption in detection of control information of the UE can be reduced.

Figure 8:
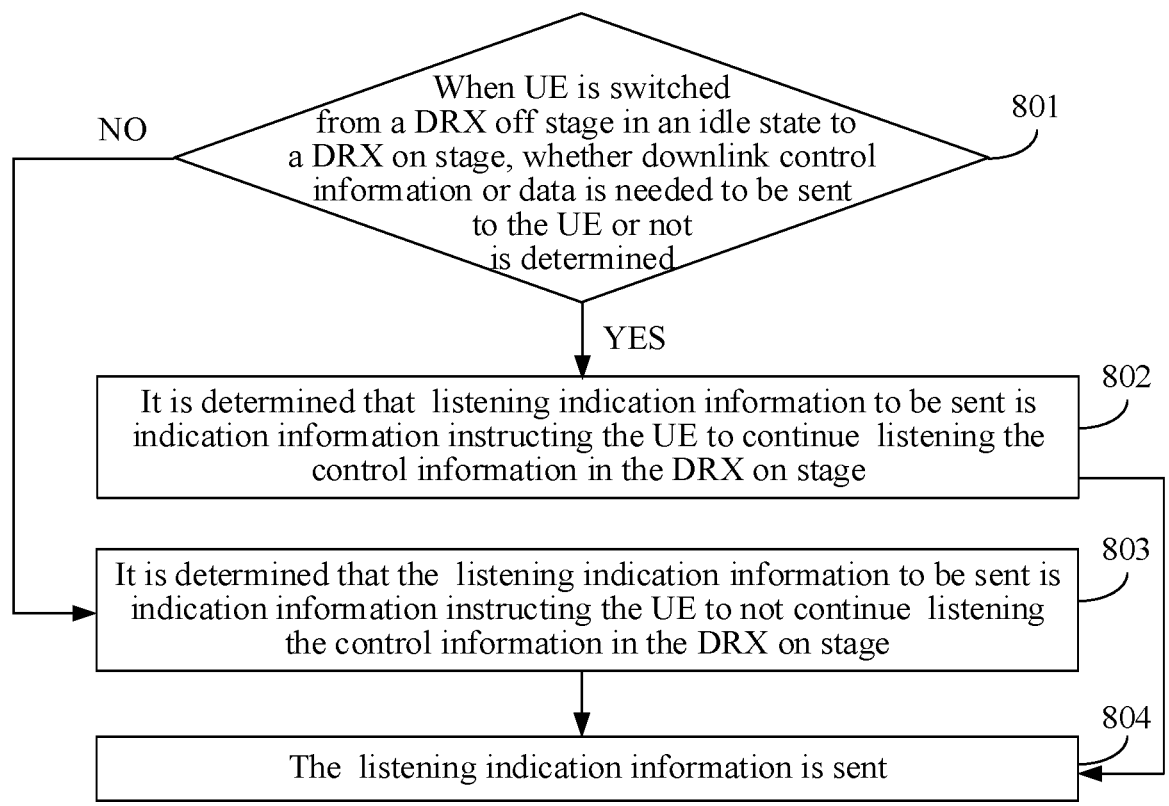
FIG. 8 is a flowchart showing another method for implementing discontinuous reception according to an exemplary embodiment.

FIG. 8 is a flowchart showing another method for implementing discontinuous reception according to an exemplary embodiment. In the embodiment, exemplary descriptions are made based on the method provided in the embodiment of the present disclosure with how to send listening indication information to a UE as an example. As shown in FIG. 8, the following steps are included.

In Step 801, when a UE is switched from a DRX off stage in an idle state to a DRX on stage, whether downlink control information or data is needed to be sent to the UE or not is determined; when the downlink control information or data is needed to be sent to the UE, Step 802 is executed, otherwise, when the downlink control information or data is not needed to be sent to the UE, Step 803 is executed.

In Step 802, it is determined that listening indication information to be sent is indication information instructing the UE to continue listening the control information in the DRX on stage, and Step 804 is executed.

In Step 803, it is determined that the listening indication information to be sent is indication information instructing the UE not to continue listening the control information in the DRX on stage.

In Step 804, the listening indication information is sent.

In the embodiment, a base station may determine listening indication information according to whether the downlink control information or data is needed to be sent to the UE or not, and may send the listening indication information to the UE, so that it is ensured that the UE listens the control information in the DRX on stage only when there is downlink control information or data for the UE, and invalid listening is avoided.

Figure 9:
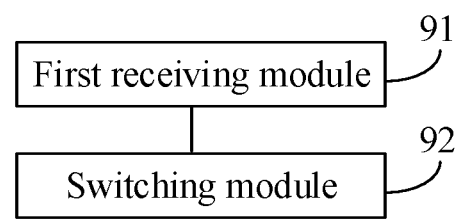
FIG. 9 is a block diagram of a device for implementing discontinuous reception according to an exemplary embodiment.

FIG. 9 is a block diagram of a device for implementing discontinuous reception according to an exemplary embodiment. The device for implementing discontinuous reception is applied to UE, and as shown in FIG. 9, includes:

a first receiving module 91, configured to, when the UE is switched from a DRX off stage in an idle state to a DRX on stage, receive listening indication information from a base station; and a switching module 92, configured to, in response to determining based on the listening indication information received by the first receiving module 91 that it is not needed to continue listening for control information in the DRX on stage, control the UE to switch from the DRX on stage to the DRX off stage.

According to the embodiment, when the UE is switched from the DRX off stage in the idle state to the DRX on stage, whether it is needed to continue listening for the control information in the DRX on stage or not may be determined based on the listening indication information sent by the base station, and when it is determined that it is not needed to continue listening for the control information, the UE may be controlled to switch from the DRX on stage to the DRX off stage, so that invalid detection of control information can be avoided, and energy consumption in detection of control information can be reduced.

Figure 10:
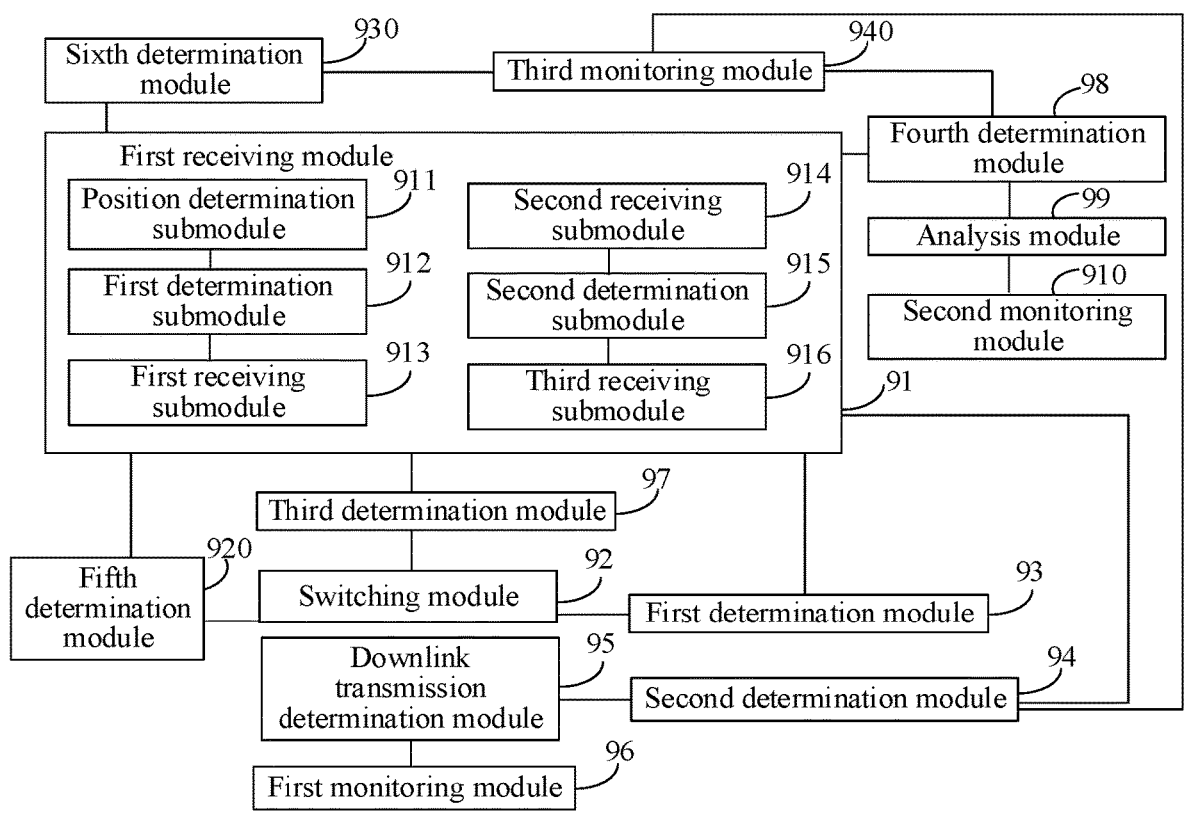
FIG. 10 is a block diagram of another device for implementing discontinuous reception according to an exemplary embodiment.

FIG. 10 is a block diagram of another device for implementing discontinuous reception according to an exemplary embodiment. As shown in FIG. 10, based on the embodiment shown in FIG. 9, in an embodiment, the listening indication information may be transmission direction indication information, or, the listening indication information may be listening control signaling, or, the listening indication information may be a wakeup signal.

In the embodiment, multiple implementation modes of the listening indication information are described to flexibly instruct the UE whether to continue listening the control information or not.

In an embodiment, the device may further include:

a first determination module 93, configured to, when the transmission direction indication information indicates that all transmission units in the DRX on stage are non-downlink transmission units, determine that it is not needed to continue listening for the control information in the DRX on stage; and a second determination module 94, configured to, when the transmission direction indication information indicates that a downlink transmission unit exists in the DRX on stage, determine that it is needed to continue listening for the control information in the DRX on stage.

In the embodiment, a manner of determining whether it is needed to listen for the control information in the DRX on stage or not based on the transmission direction indication information is described. Since the transmission direction indication information indicates directions of all the transmission units in the DRX on stage, specific listening time may be determined based on the directions of the transmission units, and invalid listening is avoided.

In an embodiment, the device may further include:

a downlink transmission determination module 95, configured to, when it is determined based on the transmission direction indication information that it is needed to listen for the control information in the DRX on stage, determine a downlink transmission unit needed to be listened in the DRX on stage; and a first listening module 96, configured to listen for the control information in the downlink transmission unit needed to be listened.

In the embodiment, the control information may be listened only in the downlink transmission unit when it is determined that it is needed to listen for the control information, so that power consumption caused by listening for the control information in the non-downlink transmission unit is avoided.

In an embodiment, the device may further include:

a third determination module 97, configured to, when the listening control signaling indicates to not listen for the control information, determine that it is not needed to continue listening for the control information in the DRX on stage; and a fourth determination module 98, configured to, when the listening control signaling indicates to listen for the control information, determine that it is needed to continue listening for the control information in the DRX on stage.

In an embodiment, the device may further include:

an analysis module 99, configured to, when the listening control signaling indicates to listen for the control information, parse the downlink transmission unit needed to be listened from the listening control signaling; and a second listening module 910, configured to listen for the control information in the downlink transmission unit.

In the embodiment, the UE may directly determine whether it is needed to listen for the control information or not based on the listening control signaling, and may be switched to the DRX off stage when listening is not needed, so that a processing complexity of the UE is further reduced, and energy consumption when it is not needed to listen the control information is greatly reduced.

In an embodiment, the device may further include:

a fifth determination module 920, configured to, when the wakeup signal is a first sequence, determine that it is not needed to continue listening for the control information in the DRX on stage; and a sixth determination module 930, configured to, when the wakeup signal is a second sequence, determine that it is needed to continue listening for the control information in the DRX on stage.

In the embodiment, the UE may directly determine whether the control information is to be listened or not based on the wakeup signal. In such a manner of determining whether to listen for the control information or not through two groups of sequences, energy consumption is lowered, and excessive occupation of communication resources is avoided, so that not only power consumption caused by listening for the control information in a non-downlink transmission unit is avoided, but also occupied communication resources are reduced.

In an embodiment, the device may further include:

a third listening module 940, configured to, in response to determining based on the listening indication information that it is needed to listen for the control information in the DRX on stage, continue listening for the control information in the DRX on stage.

In the embodiment, the UE may complete listening in the DRX on stage when listening is needed to timely enter an active state when data interaction is needed to ensure normal transmission of service data.

In an embodiment, the first receiving module 91 may include:

a position determination submodule 911, configured to determine a position for transmitting the listening indication information in the DRX on stage based on a system protocol;

a first determination submodule 912, configured to determine a window or position for receiving the listening indication information based on the position for transmitting the listening indication information in the DRX on stage; and a first receiving submodule 913, configured to receive the listening indication information at the window or a position for receiving the listening indication information.

In the embodiment, a manner of determining the receiving window based on the transmission position, predetermined by the system, of the listening indication information in the DRX on stage is described, so that the UE may be helped to pertinently receive the listening indication information, and power consumption caused by continuous information listening of the UE can be reduced.

In an embodiment, the first receiving module 91 may include:

a second receiving submodule 914, configured to receive control signaling containing the position for transmitting the listening indication information in the DRX on stage;

a second determination submodule 915, configured to determine the window or the position for receiving the listening indication information based on the position for transmitting the listening indication information in the DRX on stage; and a third receiving submodule 916, configured to receive the listening indication information at the window or the position for receiving the listening indication information.

In the embodiment, the control signaling containing the position for transmitting the listening indication information may be received from a base station to determine the receiving window and further pertinently receive the listening indication information, so that power consumption caused by continuous information listening of the UE is reduced.

Figure 11:
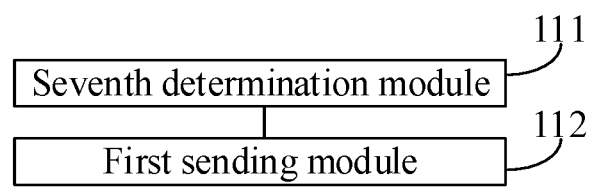
FIG. 11 is a block diagram of a device for implementing discontinuous reception according to an exemplary embodiment.

FIG. 11 is a block diagram of a device for implementing discontinuous reception according to an exemplary embodiment. The device for implementing discontinuous reception is applied to a base station, and as shown in FIG. 11, includes:

a seventh determination module 111, configured to, when a UE is switched from a DRX off stage in an idle state to a DRX on stage, determine listening indication information to be sent based on whether downlink control information or data is needed to be sent to the UE or not; and a first sending module 112, configured to send the listening indication information.

According to the embodiment, when the UE is switched from the DRX off stage in the idle state to the DRX on stage, the listening indication information may be sent to the UE to instruct the UE whether to switch from the DRX off stage to the DRX on stage again or not, so that the condition that the UE continues detecting control information when there is no downlink control information or data for the UE in the DRX on stage can be avoided, and energy consumption in detection of control information of the UE can be reduced.

Figure 12:
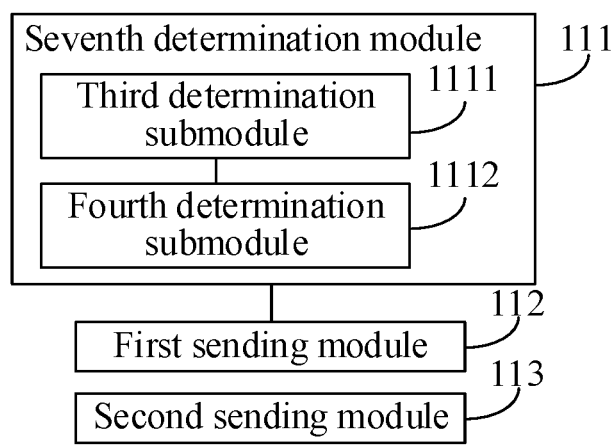
FIG. 12 is a block diagram of another device for implementing discontinuous reception according to an exemplary embodiment.

FIG. 12 is a block diagram of another device for implementing discontinuous reception according to an exemplary embodiment. As shown in FIG. 12, based on the embodiment shown in FIG. 11, in an embodiment, the listening indication information may be transmission direction indication information, or, the listening indication information may be listening control signaling, or, the listening indication information may be a wakeup signal.

In the embodiment, multiple implementation modes of the listening indication information are described to flexibly instruct the UE whether to continue listening the control information or not.

In an embodiment, the device may further include:

a second sending module 113, configured to send, to the UE, control signaling containing a position for transmitting the listening indication information in the DRX on stage, the control signaling being configured for the UE to determine a window or a position for receiving the listening indication information.

In the embodiment, the control signaling containing the position for transmitting the listening indication information may be sent to help the UE to determine the receiving window and further pertinently receive the listening indication information, so that power consumption caused by continuous information listening of the UE is reduced.

In an embodiment, the seventh determination module 111 may include:

a third determination submodule 1111, configured to, when the downlink control information or data is needed to be sent to the UE, determine that the listening indication information to be sent is indication information instructing the UE to continue listening for the control information in the DRX on stage; and a fourth determination submodule 1112, configured to, when the downlink control information or data is not needed to be sent to the UE, determine that the listening indication information to be sent is indication information instructing the UE not to continue listening for the control information in the DRX on stage.

In the embodiment, the base station may determine corresponding listening indication information according to whether the downlink control information or data is needed to be sent to the UE or not and then send the corresponding listening indication information to the UE, so that it is ensured that the UE listens for the control information in the DRX on stage only when there is downlink control information or data for itself, and invalid listening is avoided.

FIG. 12 is a block diagram of a device applied to implementation of discontinuous reception according to an exemplary embodiment. For example, the device 1300 may be UE such as a mobile phone, a computer, a digital broadcast terminal, a messaging device, a gaming console, a tablet, a medical device, exercise equipment and a personal digital assistant.

Figure 13:
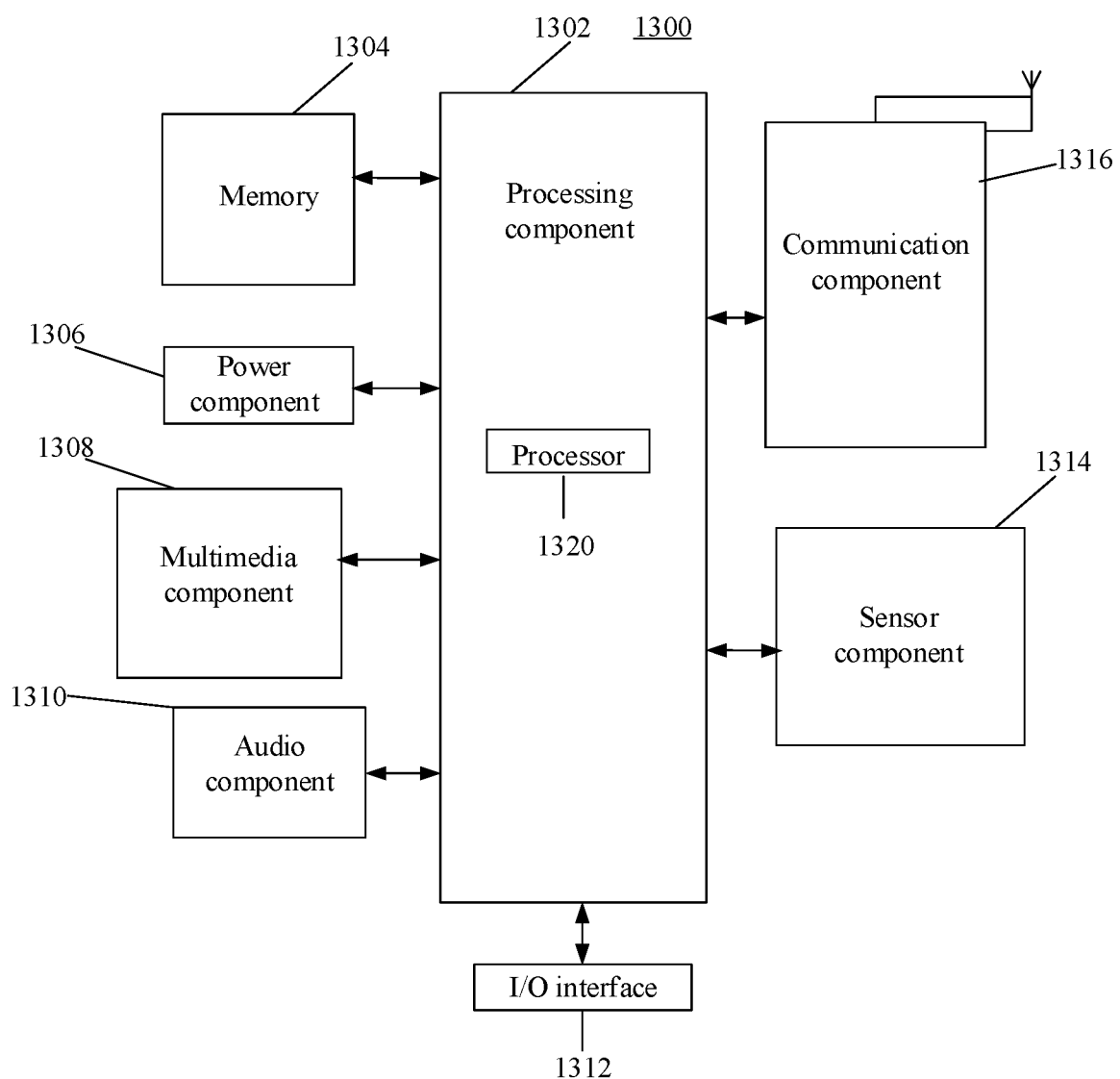
FIG. 13 is a block diagram of a device applied to implementation of discontinuous reception according to an exemplary embodiment.

Referring to FIG. 13, the device 1300 may include one or more of the following components: a processing component 1302, a memory 1304, a power component 1306, a multimedia component 1308, an audio component 1310, an Input/Output (I/O) interface 1312, a sensor component 1314, and a communication component 1316.

The processing component 1302 is typically configured to control overall operations of the device 1300, such as the operations associated with display, telephone calls, data communications, camera operations, and recording operations. The processing component 1302 may include one or more processors 1320 to execute instructions to perform all or part of the steps in the abovementioned method. Moreover, the processing component 1302 may include one or more modules which facilitate interaction between the processing component 1302 and other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any application programs or methods operated on the device 1300, contact data, phonebook data, messages, pictures, video, etc. The memory 1304 may be implemented by any type of volatile or non-volatile memory devices, or a combination thereof, such as a Static Random Access Memory (SRAM), an Electrically Erasable Programmable Read-Only Memory (EE- PROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1306 may provide power for various components of the device 1300. The power component 1306 may include a power management system, one or more power supplies, and other components associated with generation, management and distribution of power for the device 1300.

The multimedia component 1308 may include a screen providing an output interface between the device 1300 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1310 is configured to output and/or input an audio signal. For example, the audio component 1310 may include a Microphone (MIC), and the MIC is configured to receive an external audio signal when the device 1300 is in the operation mode, such as a call mode, a recording mode and a voice recognition mode. The received audio signal may further be stored in the memory 1304 or sent through the communication component 1316. In some embodiments, the audio component 1310 may further include a speaker configured to output the audio signal.

The I/O interface 1312 may provide an interface between the processing component 1302 and a peripheral interface module, and the peripheral interface module may be a keyboard, a click wheel, a button and the like. The button may include, but not limited to: a home button, a volume button, a starting button and a locking button.

The sensor component 1314 may include one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and another device. The device 1300 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1316 receives a broadcast signal or broadcast associated information from an external broadcast management system through a broadcast channel. In an exemplary embodiment, the communication component 1316 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is provided a non-transitory computer-readable storage medium including an instruction, for example, a memory 1304 including an instruction, the instruction being executable to cause the processor 1320 of the device 1300 to execute the method described in the first aspect including: receiving listening indication information from a base station when UE is switched from a DRX off stage in an idle state to a DRX on stage; and controlling the UE to switch from the DRX on stage to the DRX off stage when it is determined based on the listening indication information that it is not needed to continue listening control information in the DRX on stage.

In an embodiment, the non-transitory computer-readable storage medium may be a ROM, a Random-Access Memory (RAM), a Compact Disc Read-Only Memory (CD-ROM), a magnetic tape, a floppy disc, an optical data storage device and the like.

Figure 14:
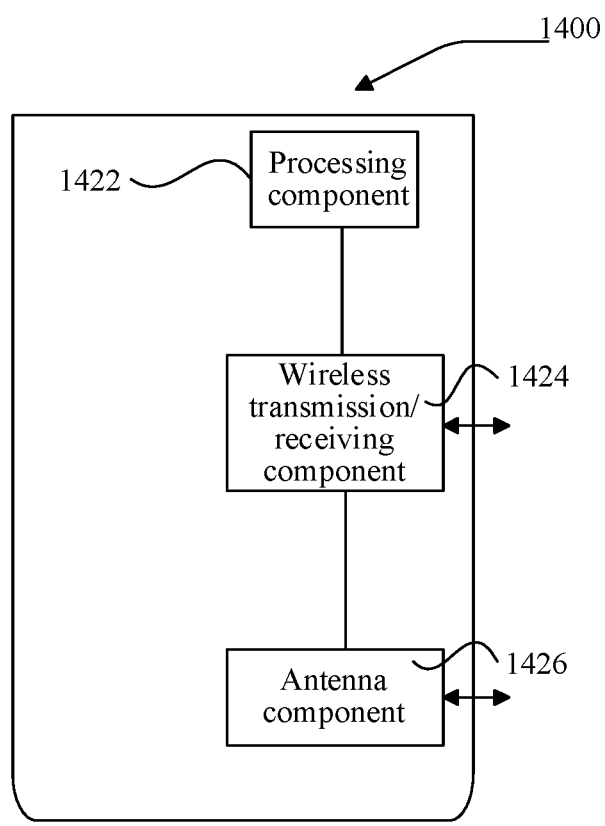
FIG. 14 is a block diagram of a device applied to implementation of discontinuous reception according to an exemplary embodiment.

FIG. 14 is a block diagram of a device applied to data sending according to an exemplary embodiment. The device 1400 may be provided as a base station. Referring to FIG. 14, the device 1400 includes a processing component 1422, a wireless transmission/receiving component 1424, an antenna component 1426 and a wireless interface-specific signal processing part, and the processing component 1422 may further include one or more processors.

One processor in the processing component 1422 may be configured to execute the method for implementing discontinuous reception described in the second aspect.

In an exemplary embodiment, there is also provided a non-transitory computer-readable storage medium including an instruction, and the instruction may be executed by the processing component 1422 of the device 1400 to implement the method described in the second aspect. For example, the non-transitory computer-readable storage medium may be a ROM, a RAM, a CD-ROM, a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for implementing discontinuous reception (DRX), applied to a User Equipment (UE), the method comprising:
when the UE is switched from a DRX off stage in an idle state to a DRX on stage, receiving listening indication information from a base station; and
in response to determining based on the listening indication information that it is not needed to continue listening for control information in the DRX on stage, controlling the UE to switch from the DRX on stage to the DRX off stage,
wherein said receiving the listening indication information from the base station comprises:
determining a position for transmitting the listening indication information in the DRX on stage based on a system protocol;
determining a window or a position for receiving the listening indication information based on the position for transmitting the listening indication information in the DRX on stage; and
receiving the listening indication information at the window or position for receiving the listening indication information;
or,
said receiving the listening indication information from the base station comprises:
receiving control signaling containing a position for transmitting the listening indication information in the DRX on stage;
determining a window or a position for receiving the listening indication information based on the position for transmitting the listening indication information in the DRX on stage; and
receiving the listening indication information at the window or the position for receiving the listening indication information.

2. The method of claim 1, wherein the listening indication information is transmission direction indication information; or, the listening indication information is listening control signaling; or, the listening indication information is a wakeup signal.

3. The method of claim 2, further comprising:
when the transmission direction indication information indicates that all transmission units in the DRX on stage are non-downlink transmission units, determining that it is not needed to continue listening for the control information in the DRX on stage; or
when the transmission direction indication information indicates that a downlink transmission unit exists in the DRX on stage, determining that it is needed to continue listening for the control information in the DRX on stage.

4. The method of claim 3, further comprising:
in response to determining based on the transmission direction indication information that it is needed to listen for the control information in the DRX on stage, determining a downlink transmission unit needed to be listened in the DRX on stage; and
listening for the control information in the downlink transmission unit needed to be listened.

5. The method of claim 2, further comprising:
when the listening control signaling indicates to listen for the control information, parsing, from the listening control signaling, the downlink transmission unit needed to be listened; and
listening for the control information in the downlink transmission unit.

6. The method of claim 2, further comprising:
when the wakeup signal is a first sequence, determining that it is not needed to continue listening for the control information in the DRX on stage; or
when the wakeup signal is a second sequence, determining that it is needed to continue listening for the control information in the DRX on stage.

7. The method of claim 1, further comprising:
in response to determining based on the listening indication information that it is needed to listen the control information in the DRX on stage, continuing listening for the control information in the DRX on stage.

8. A communication system implementing the method of claim 1, comprising the UE and the base station, wherein the base station is configured to:
when the UE is switched from the DRX off stage in an idle state to the DRX on stage, determine, based on whether downlink control information or data is needed to be sent to the UE, listening indication information to be sent; and
send the listening indication information;
wherein the UE is controlled to switch from the DRX on stage to the DRX off stage to thereby avoid invalid detection of control information and reduce energy consumption in detection of the control information.

9. A device for implementing discontinuous reception (DRX), implemented by a User Equipment (UE), comprising:
a processor; and
memory configured to store an instruction executable by the processor,
wherein the processor is configured to;
when the UE is switched from a DRX off stage in an idle state to a DRX on stage, receive listening indication information from a base station; and
in response to determining based on the listening indication information that it is not needed to continue listening for control information in the DRX on stage, control the UE to switch from the DRX on stage to the DRX off stage,
wherein the processor is further configured to:
determine a position for transmitting the listening indication information in the DRX on stage based on a system protocol;
determine a window or a position for receiving the listening indication information based on the position for transmitting the listening indication information in the DRX on stage; and
receive the listening indication information at the window or position for receiving the listening indication information;
or,
the processor is further configured to:

receive control signaling containing a position for transmitting the listening indication information in the DRX on stage;

determine a window or a position for receiving the listening indication information based on the position for transmitting the listening indication information in the DRX on stage; and receive the listening indication information at the window or the position for receiving the listening indication information.

10. The device of claim 9, wherein the listening indication information is transmission direction indication information; or, the listening indication information is listening control signaling; or, the listening indication information is a wakeup signal.

11. The device of claim 10, wherein the processor is further configured to:

when the transmission direction indication information indicates that all transmission units in the DRX on stage are non-downlink transmission units, determine that it is not needed to continue listening for the control information in the DRX on stage; and when the transmission direction indication information indicates that a downlink transmission unit exists in the DRX on stage, determine that it is needed to continue listening for the control information in the DRX on stage.

12. The device of claim 11, wherein the processor is further configured to:

in response to determining based on the transmission direction indication information that it is needed to listen for the control information in the DRX on stage, determine a downlink transmission unit needed to be listened in the DRX on stage; and listen for the control information in the downlink transmission unit needed to be listened.

13. The device of claim 10, wherein the processor is further configured to:

when the listening control signaling indicates to listen for the control information, parse, from the listening control signaling, the downlink transmission unit needed to be listened; and listen for the control information in the downlink transmission unit.

14. The device of claim 10, wherein the processor is further configured to:

when the wakeup signal is a first sequence, determine that it is not needed to continue listening for the control information in the DRX on stage; and when the wakeup signal is a second sequence, determine that it is needed to continue listening for the control information in the DRX on stage.

* * * * *